United States Patent
Harada et al.

(10) Patent No.: US 9,693,291 B2
(45) Date of Patent: Jun. 27, 2017

(54) USER TERMINAL, RADIO BASE STATION AND COMMUNICATION CONTROL METHOD

(71) Applicant: NTT DOCOMO, INC., Tokyo (JP)

(72) Inventors: Hiroki Harada, Tokyo (JP); Liu Liu, Beijing (CN); Lan Chen, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 30 days.

(21) Appl. No.: 14/908,916

(22) PCT Filed: Jul. 8, 2014

(86) PCT No.: PCT/JP2014/068220
§ 371 (c)(1),
(2) Date: Jan. 29, 2016

(87) PCT Pub. No.: WO2015/016020
PCT Pub. Date: Feb. 5, 2015

(65) Prior Publication Data
US 2016/0183173 A1    Jun. 23, 2016

(30) Foreign Application Priority Data
Aug. 1, 2013 (JP) .................. 2013-160728

(51) Int. Cl.
*H04W 4/00* (2009.01)
*H04W 48/16* (2009.01)
(Continued)

(52) U.S. Cl.
CPC .......... *H04W 48/16* (2013.01); *H04W 16/32* (2013.01); *H04W 48/12* (2013.01); *H04W 36/0072* (2013.01); *H04W 84/045* (2013.01)

(58) Field of Classification Search
CPC ... H04W 24/10; H04W 84/045; H04W 16/32; H04W 24/08; H04W 28/048;
(Continued)

(56) References Cited

U.S. PATENT DOCUMENTS

| | | | | |
|---|---|---|---|---|
| 2007/0099561 A1* | 5/2007 | Voss | ...................... | H04W 24/00 455/12.1 |
| 2010/0234027 A1* | 9/2010 | Han | .................. | H04W 36/0083 455/436 |
| 2015/0312818 A1* | 10/2015 | Yiu | ................... | H04W 36/0094 455/436 |

OTHER PUBLICATIONS

International Search Report issued in PCT/JP2014/068220 mailed on Oct. 7, 2014 (1 page).
(Continued)

*Primary Examiner* — Nimesh Patel
(74) *Attorney, Agent, or Firm* — Osha Liang LLP

(57) ABSTRACT

The present invention is designed to allow more reliable small cell detection while preventing the increase of power consumption in user terminals. The communication control method of the present invention includes the steps in which a macro base station notifies a user terminal of measurement gap pattern information to represent a repetition period that is the same as the transmission cycle of a detection/measurement signal in small cells and a length of time that is the same as the transmission duration of the detection/measurement signal, and the start offset of the transmission duration, and the user terminal configures measurement gaps of the repetition period and the length of time, by using a start offset that is the same as the start offset.

15 Claims, 15 Drawing Sheets

(51) Int. Cl.
*H04W 48/12* (2009.01)
*H04W 16/32* (2009.01)
*H04W 84/04* (2009.01)
*H04W 36/00* (2009.01)

(58) Field of Classification Search
CPC . H04W 36/0088; H04W 36/14; H04W 36/00; H04W 52/24; H04W 28/06; H04W 72/1226; H04W 36/0055; H04W 36/0094; H04W 36/06; H04W 36/30; H04W 48/16; H04W 72/04; H04W 28/08; H04W 52/244; H04W 16/00; H04W 72/12; H04W 74/002; H04W 36/04; H04W 36/0083; H04W 36/08; H04W 24/02; H04W 36/165; H04W 36/0005; H04W 36/0072; H04W 72/02; H04W 28/0236; H04W 28/0268; H04W 28/02; H04J 11/00; H04J 11/0073; H04J 11/0076
See application file for complete search history.

(56) References Cited

OTHER PUBLICATIONS

Written Opinion of the International Searching Authority issued in PCT/JP2014/068220 mailed on Oct. 7, 2014 (3 pages).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).
3GPP TS 36.133 V11.4.0; "3rd Generation Partnership Project; Technical Specification Group Radio Access Network; Evolved Universal Terrestrial Radio Access (E-UTRA); Requirements for support of radio resource management (Release 11)"; Mar. 2013 (677 pages).

* cited by examiner

| GAP PATTERN ID | MEASUREMENT GAP LENGTH (MGL, ms) | MEASUREMENT GAP REPETITION PERIOD (MGRP, ms) |
| --- | --- | --- |
| 0 | 6 | 40 |
| 1 | 6 | 80 |

| GAP PATTERN ID (NEW) | MEASUREMENT GAP LENGTH (MGL, ms) | MEASUREMENT GAP REPETITION PERIOD (MGRP, ms) |
|---|---|---|
| 0 | 6 | 40 |
| 1 | 6 | 80 |
| 2 | DS TRANSMISSION DURATION, e.g.1ms | DS CYCLE, e.g.100 ms |

USER TERMINAL, RADIO BASE STATION AND COMMUNICATION CONTROL METHOD

TECHNICAL FIELD

The present invention relates to a user terminal, a radio base station and a communication control method in a next-generation mobile communication system in which small cells are placed within a macro cell.

BACKGROUND ART

In LTE (Long Term Evolution) and successor systems of LTE (referred to as, for example, "LTE-advanced," "FRA (Future Radio Access)," "4G," etc.), a radio communication system (referred to as, for example, "HetNet" (Heterogeneous Network)) to place small cells (including pico cells, femto cells and so on) having a relatively small coverage of a radius of approximately several meters to several tens of meters, in a macro cell having a relatively large coverage of a radius of approximately several hundred meters to several kilometers, is under study (see, for example, non-patent literature 1).

For this radio communication system, a scenario ("co-channel deployment") to use the same frequency band F1 in both the macro cell and the small cells as shown in FIG. 1 and a scenario ("non-co-channel deployment," "separate frequency deployment," etc.) to use different frequency bands F1 and F2 between the macro cell and the small cells are under study. Also, a scenario to form a small cell cluster with a plurality of small cells without placing a macro cell (without macro coverage) is also under study.

CITATION LIST

Non-Patent Literature

Non-patent Literature 1: 3GPP TR 36.814 "E-UTRA Further Advancements for E-UTRA Physical Layer Aspects"

SUMMARY OF INVENTION

Technical Problem

In radio communication systems such as those shown in FIG. 1, the PSS (Primary Synchronization Signal), the SSS (Secondary Synchronization Signal), the CRS (Cell-specific Reference Signal) and so on are used as signals for macro cell detection and/or measurements (hereinafter referred to as "detection/measurement reference signals").

As for the signals for small cell detection/measurements, signals apart from the PSS, SSS and CRS are under study for use. To be more specific, the use of detection/measurement signals that take shorter time for detection and that are transmitted in a longer cycle than the PSS, SSS and CRS (for example, discovery signals) in small cells is under study. With such detection/measurement signals, it is possible to prevent the increase of power consumption in user terminals pertaining to small cell detection and/or measurements.

However, when detection/measurement signals apart from the PSS, SSS and CRS are used in small cells in order to prevent the increase of power consumption in user terminals, cases might occur where the user terminals are unable to detect the small cells.

The present invention has been made in view of the above, and it is therefore an object of the present invention to provide a user terminal, a radio base station and a communication control method to allow more reliable detection of small cells while preventing the increase of power consumption in user terminals.

Solution to Problem

A communication control method according to the present invention provides a communication control method in a radio communication system where a small cell to use a second frequency is placed within a macro cell to use a first frequency, and this communication control method comprising the steps in which a macro base station to form the macro cell notifies a user terminal of measurement gap pattern information to represent a repetition period that is the same as the transmission cycle of a detection/measurement signal in the small cell and a length of time that is the same as the transmission duration of the detection/measurement signal, and the start offset of the transmission duration, and the user terminal configures a measurement gap of the repetition period and the length of time, by using a start offset that is the same as the start offset.

Advantageous Effects of Invention

According to the present invention, it is possible to detect small cells more reliably while preventing the increase of power consumption in user terminals.

BRIEF DESCRIPTION OF DRAWINGS

FIG. 10 provides diagrams to explain the effects of the communication control methods according to the first and second examples of the present embodiment;

DESCRIPTION OF EMBODIMENTS

Figure 1:
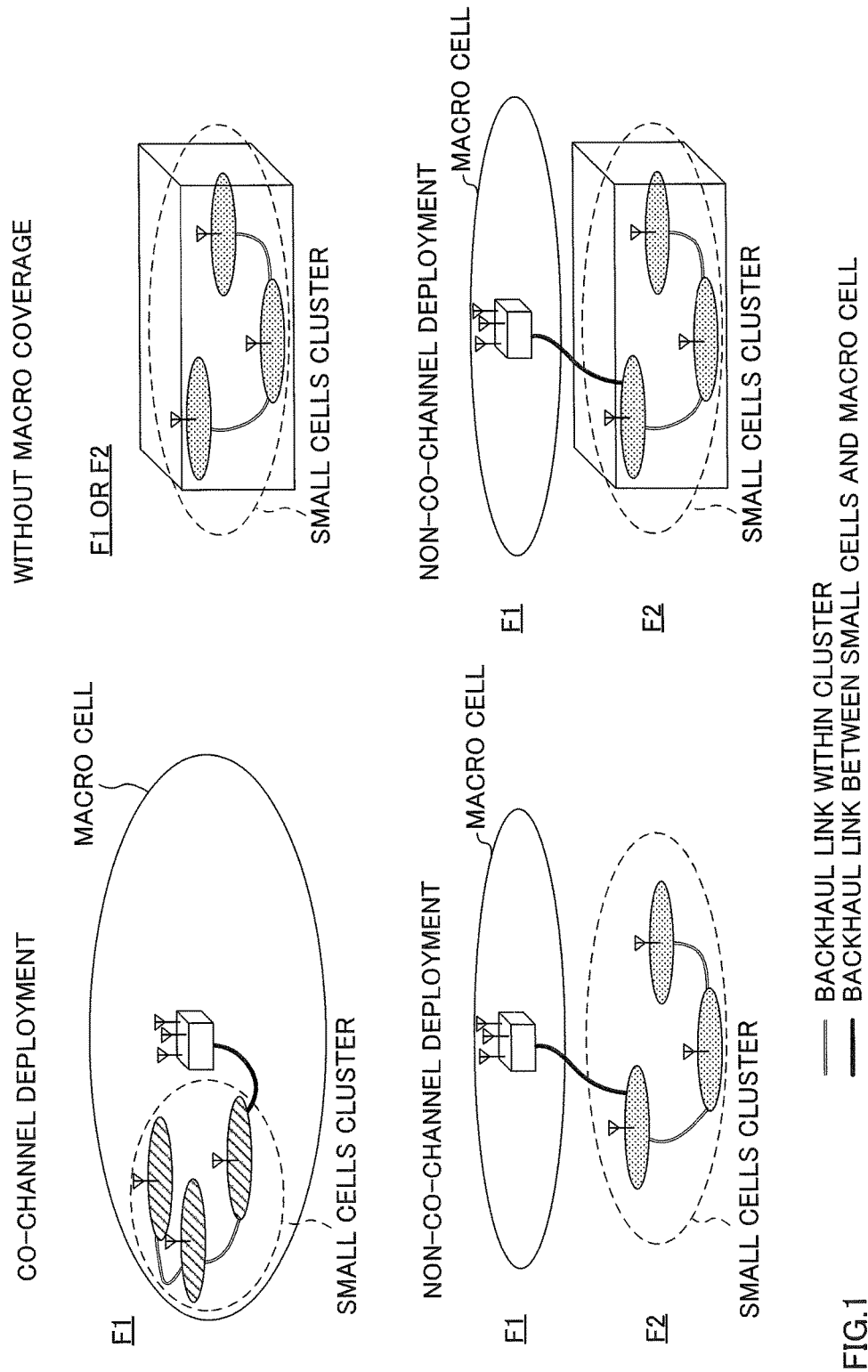
FIG. 1 is a diagram to explain radio communication systems in which small cells are arranged in a macro cell.
Figure 2A:
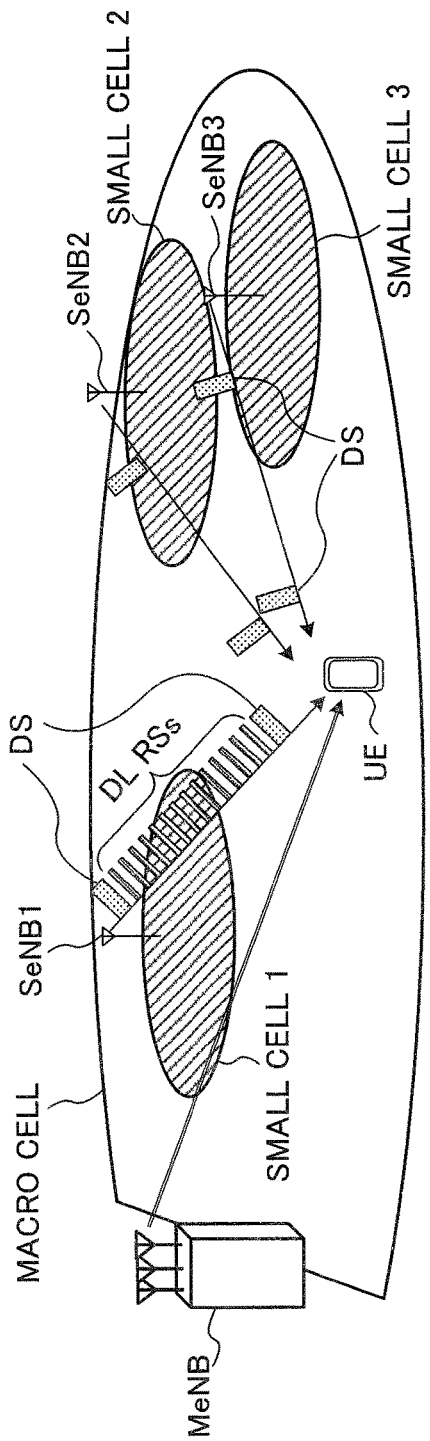
FIG. 2 provides diagrams to explain a radio communication system where introduction of discovery signals is under study.

FIG. 2 provides diagrams to explain a radio communication system where introduction of discovery signals is under study. As shown in FIG. 2A, the radio communication system is comprised of a radio base station that forms a macro cell (hereinafter referred to as "macro base station (MeNB: Macro eNodeB)"), radio base stations 1 to 3 that form small cells (hereinafter referred to as "small base stations (SeNBs: Small eNodeBs)") 1 to 3, and a user terminal (UE: User Equipment).

In the radio communication system shown in FIG. 2A, a relatively low frequency (carrier) F1 such as, for example, 800 MHz or 2 GHz is used in the macro cell, and a relatively high frequency (carrier) F2 such as, for example, 3.5 GHz or 10 GHz is used in the small cells 1 to 3. Note that FIG. 2A is simply an example, and the same frequency (carrier) may be used between the macro cell and the small cells 1 to 3.

In the radio communication system shown in FIG. 2A, the user terminal communicates with the macro base station. Also, the user terminal detects the small cells 1 to 3 based on the discovery signals (DSs) from the small base stations 1 to 3. The discovery signals here are small cell detection/measurement signals, and may be configured by updating reference signals such as the CSI-RS (Channel State Information-Reference Signal) and the PRS (Positioning Reference Signal), or may be configured anew.

Figure 2B:
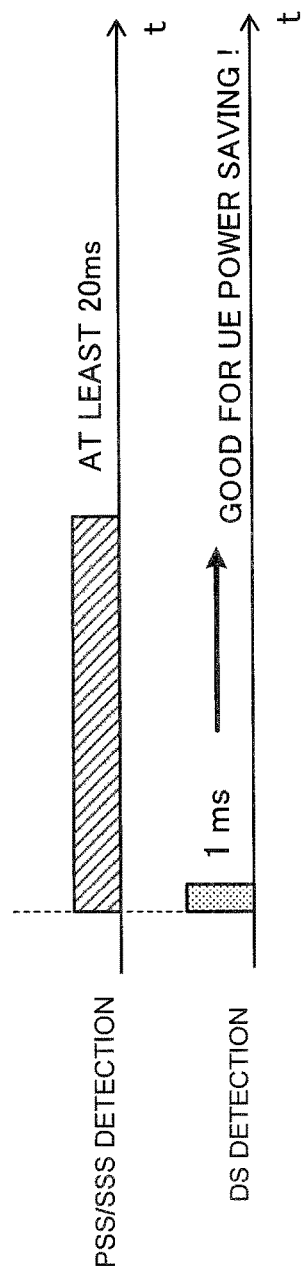

Also, in the radio communication system shown in FIG. 2A, the discovery signal is arranged in subframes in a higher resource density than the macro cell detection/measurement signal (for example, the PSS, SSS, etc.) and with inter-cell orthogonality. Consequently, as shown in FIG. 2B, the time the user terminal takes to detect the discovery signal is shorter than the time it takes to detect the PSS or SSS. As a result of this, when the discovery signal is used as a small cell detection/measurement signal, it is possible to prevent the increase of power consumption which the user terminal requires for measurements, compared to the case of using the PSS or SSS.

Figure 3:
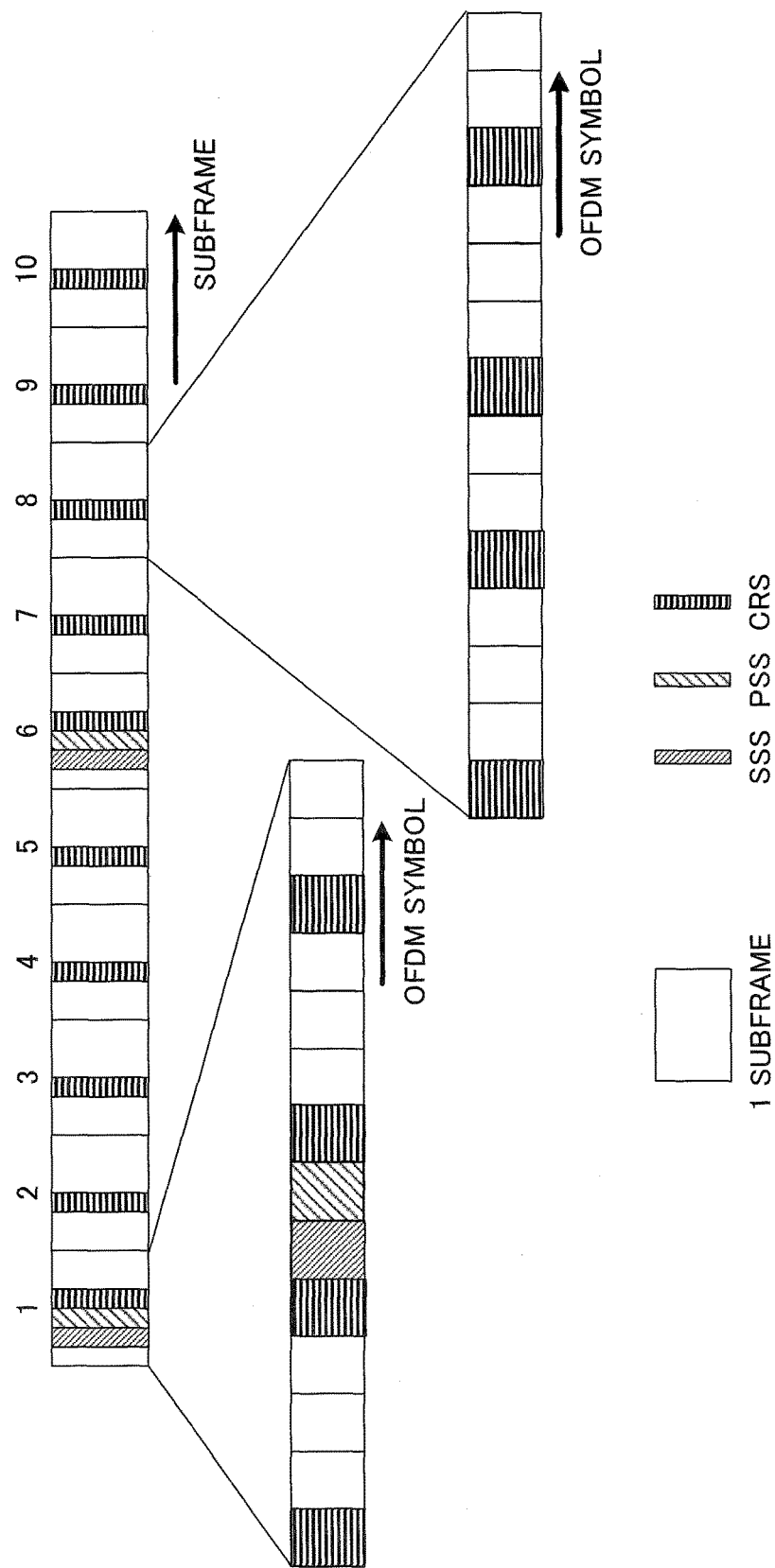
FIG. 3 is a diagram to explain the CRS, PSS and SSS transmission cycles.

Also, the discovery signal is under study for transmission in a longer cycle than the PSS, SSS and CRS. As shown in FIG. 3, the CRS is transmitted in every subframe and the PSS and SSS are transmitted every five subframes. To be more specific, subframes 1 and 6 where the PSS, SSS and CRS are arranged, and subframes 2 to 5 and 7 to 10 where the CRS is arranged, are provided in a radio frame. In subframes 1 and 6, the CRS is arranged in four OFDM symbols, the SSS is arranged in the sixth OFDM symbol and the PSS is arranged in the seventh OFDM symbol. Also, in subframes 2 to 5 and 7 to 10, the CRS is arranged in four OFDM symbols. By contrast with this, the discovery signal is being studied for transmission per, for example, 100 subframes (100 ms cycle). In this case, it is possible to prevent the increase of overhead due to the transmission of the discovery signal and the increases of interference which the discovery signal causes against user terminals in nearby cells.

Here, when a user terminal receives a detection/measurement signal (for example, the PSS, the SSS, the CRS, the discovery signal and so on), discovers the detection/measurement signal and measures its received quality, this refers to the "measurements" used herein. If the received quality of the detection/measurement signal in the user terminal fulfills predetermined quality, a cell is detected. Note that the received quality measured in the user terminal is, for example, the RSRP (Reference Signal Received Power), the RSRQ (Reference Signal Received Quality), the SINR (Signal to Interference plus Noise Ratio) and so on.

Also, the measurements include inter-frequency measurements and intra-frequency measurements. Inter-frequency measurements refers to receiving a detection/measurement signal that is transmitted in a different frequency from that of the connecting cell and measuring the received quality of this detection/measurement signal. On the other hand, intra-frequency measurements refers to receiving a detection/measurement signal that is transmitted in the same frequency as that of the connecting cell and measuring the received quality of this detection/measurement signal.

Referring to the radio communication system shown in FIG. 2A, the user terminal that is connected with the macro base station (that is, the user terminal in RRC-connected mode) switches the receiving frequency from the frequency F1 to the frequency F2 in measurement gaps, measures the received quality of the detection/measurement signals (for example, the discovery signal and so on) transmitted in the frequency F2, and detects the small cells.

Here, a measurement gap refers to a period for measuring (detecting) the detection/measurement signals that are transmitted using a different frequency F2, where reception in the communicating frequency F1 is stopped and another frequency F2 starts being received. In measurement gaps, a predetermined length of time (hereinafter referred to as "measurement gap length (MGL)") repeats in a predetermined repetition period (hereinafter referred to as the "measurement gap repetition period (MGRP)). Also, when discontinuous reception (hereinafter referred to as "discontinuous reception (DRX)") is carried out, in measurement gaps, the user terminal assumes the on state (that is, the state in which the receiving circuit is switched on) even when not in the on period.

Inter-frequency measurements using the PSS, SSS and CRS will be described with reference to FIG. 4. As shown in FIG. 4A, in inter-frequency measurements, measurement gap patterns, which are the combinations of the above MGL and MGRP, are defined. For example, in FIG. 4A, a measurement gap pattern 0, in which the MG is 6 ms and the MGRP is 40 ms, and a measurement gap pattern 1, in which the MGL is 6 ms and the MGRP is 80 ms, are defined.

Also, in inter-frequency measurements, the gap offset is notified through RRC signaling. As shown in FIG. 4B, a gap offset refers to the start offset from the top of a radio frame to the beginning of a measurement gap, and indicates the time of the measurement gap. A user terminal may specify measurement gap patterns (see FIG. 4A) based on gap offsets notified. In this case, the measurement gap patterns of FIG. 4A are implicitly notified.

Figures 4A, 4B:
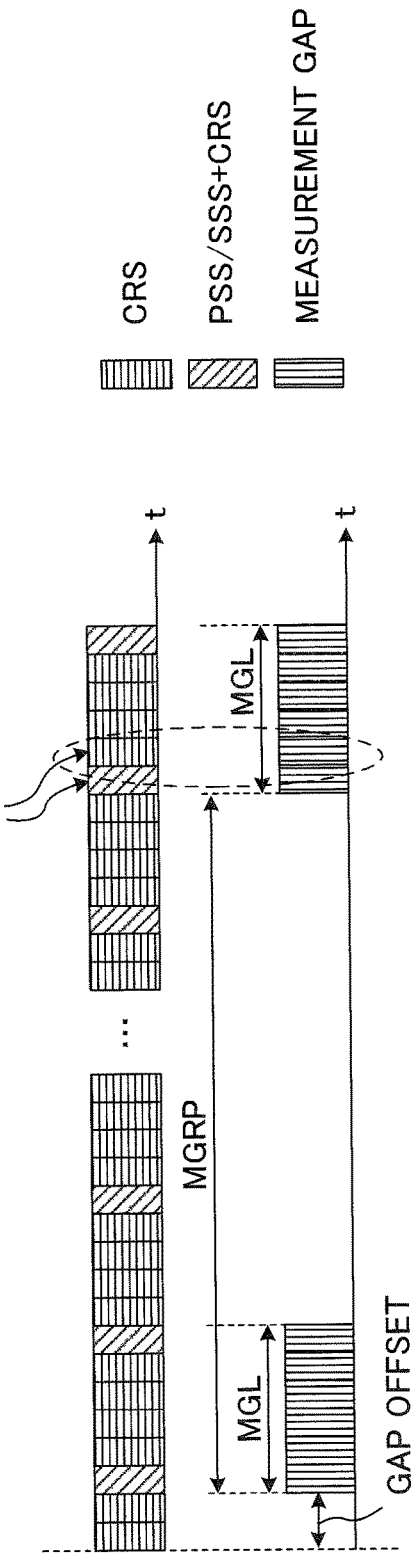
FIG. 4 provides diagrams to explain inter-frequency measurements using the CRS, PSS and SSS.

For example, FIG. 4B shows a measurement gap pattern in which the MGL is 6 ms and the MGRP is 40 ms or 80 ms. Also, the CRS is transmitted in every subframe, and the PSS and SSS are transmitted every five subframes. In this case, the user terminal can receive the CRS, PSS and SSS in the measurement gaps of a 6-ms-MGL and detect small cells.

Meanwhile, when the discovery signal is used as a small cell detection/measurement signal, the use of the measurement gap patterns defined in FIG. 4A might result in the situation where small cells cannot be detected. Inter-frequency measurements using the discovery signal will be described with reference to FIG. 5. Assume that, in FIG. 5, similar to FIG. 4B, the MGL is 6 ms (six subframes) and the MGRP is 40 ms or 80 ms.

Figure 5:
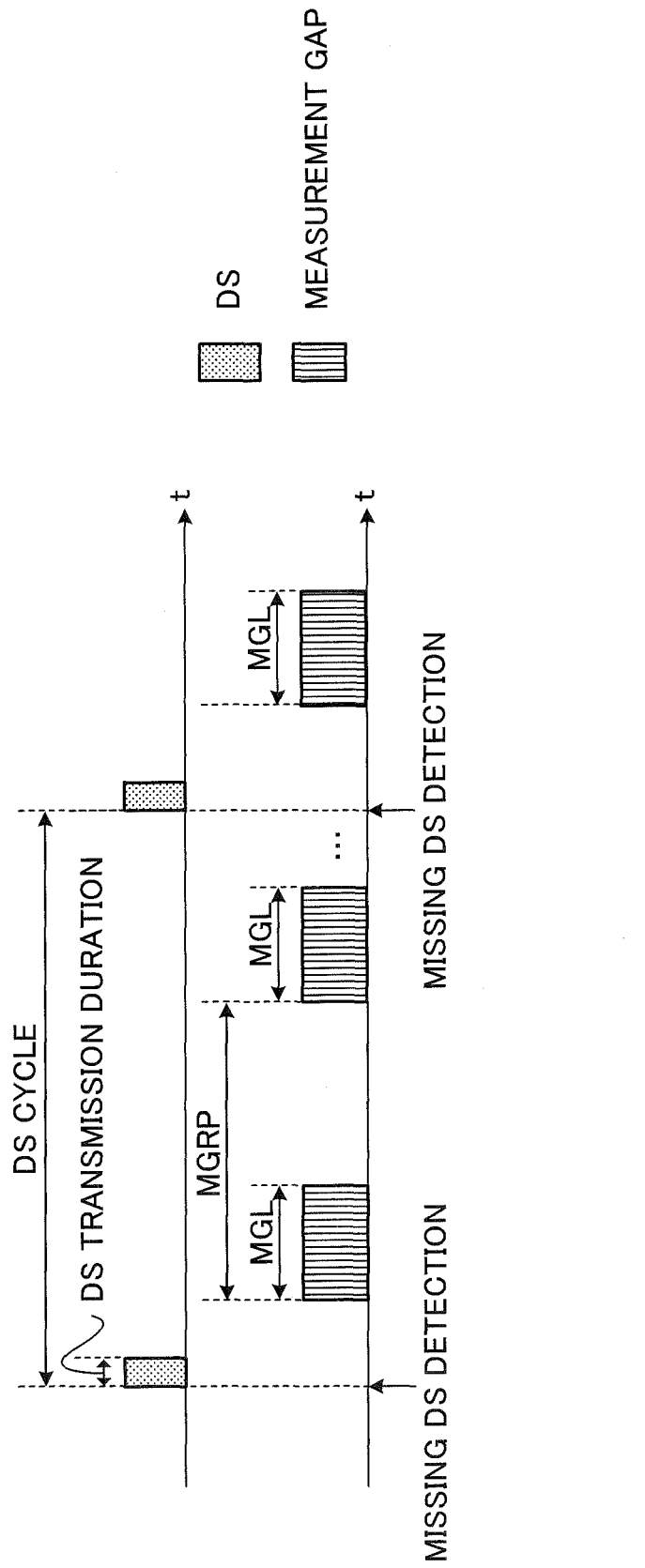
FIG. 5 is a diagram to explain inter-frequency measurements using discovery signals.

Also, assume that, in FIG. 5, the DS transmission duration is 1 ms and the DS cycle is 100 ms. Here, the DS transmission duration is the discovery signal transmission duration, and has a predetermined length of time. Also, the DS cycle is the discovery signal transmission cycle.

As shown in FIG. 5, the discovery signal is not transmitted as frequently as the CRS, PSS and SSS of FIG. 4B. Consequently, the use of the measurement patterns defined in FIG. 4A might, as shown in FIG. 5, result in the situation where the DS transmission durations and the measurement gaps do not overlap and therefore small cells cannot be detected. Otherwise, the situation might occur where it takes a long time before a DS transmission duration overlaps a measurement gap and therefore timely detection of small cells is not possible.

As described above, when the discovery signal is used as a small cell detection/measurement signal in order to prevent the increase of power consumption in user terminals, cases might occur where the user terminals cannot detect small cells. So, the present inventors have come up with the idea of enabling reliable small cell detection, while preventing the increase of power consumption in user terminals, by making the DS transmission durations and measurement gaps match in time.

Figures 6A, 6B:
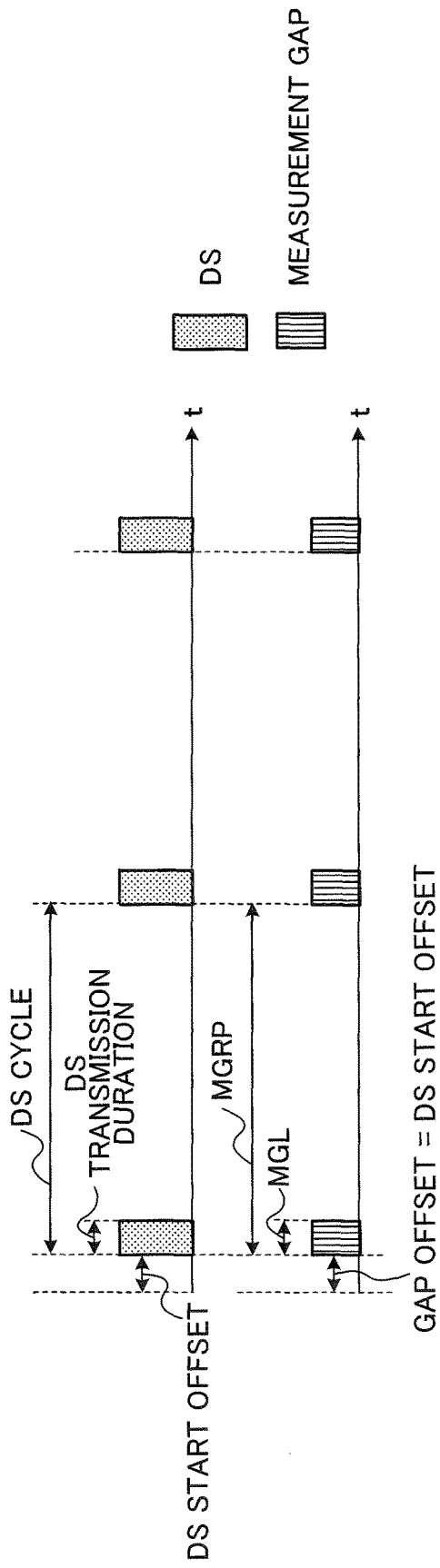
FIG. 6 provides conceptual diagrams of inter-frequency measurements according to the present invention.

FIG. 6 provides conceptual diagrams of inter-frequency measurements according to the present invention. As shown in FIG. 6A, in inter-frequency measurements according to the present invention, a measurement gap pattern 2 for detecting the discovery signal is defined. In this measurement gap pattern 2, the MGL has an equal length of time to that of the DS transmission duration (for example, 1 ms). Also, the MGRP has an equal length of time to that of the DS transmission cycle (for example, 100 ms).

Also, in inter-frequency measurements according to the present invention, a macro base station reports measurement gap pattern information to user terminals. The measurement gap pattern information is, for example, the gap pattern identifier (gap pattern ID) to represent the MGL and MGRP (see FIG. 6A), but this is by no means limiting. The measurement gap pattern information may be any information (for example, the above-noted gap offset) as long as it is information to represent the MGL and the MGRP—that is, the measurement gap pattern. Also, the measurement gap pattern information is notified to user terminals through higher layer signaling such as, for example, RRC (Radio Resource Control) signaling.

Also, in inter-frequency measurements according to the present invention, a macro base station transmits discovery signal (DS) configuration information to user terminals. The DS configuration information is information related to the configuration of the discovery signal, and includes at least one of the above-noted DS transmission duration, DS cycle and DS start offset. Note that the DS start offset is the start offset from the top of a radio frame to the beginning of a DS transmission duration (for example, the subframe number where a DS transmission duration begins), and represents the discovery signal transmission time.

As shown in FIG. 6B, the DS transmission duration begins based on the DS start offset, and configured in the DS cycle. Also, in FIG. 6B, a user terminal receives measurement gap pattern information, representing an MGRP (repetition period) that is the same as the DS cycle, and an MGL (length of time) that is the same as the DS transmission duration, and the DS start offset, from the macro base station. Using a start offset that is the same as this DS start offset, the user terminal configures measurement gaps of the above MGRP and MGL. By this means, the DS transmission durations and the measurement gaps match in time.

In the measurement gaps configured in the above-described manner, the user terminal receives the discovery signals transmitted using the frequency F2 and measures the received quality of the discovery signals. The user terminal reports the measurement result to the macro base station as a measurement report.

In inter-frequency measurements according to the present invention, measurement gaps to have an MGRP that is the same as the DS cycle and an MGL that is the same as the DS transmission duration are configured by using a start offset that is the same as the DS start offset, the DS transmission durations and the measurement gaps match in time. Consequently, when the discovery signal is used in order to prevent the increase of power consumption in user terminals, the user terminals can detect small cells more reliably.

Now, the communication control method according to the present embodiment will be described in detail below. Note that the communication control method according to the present embodiment is used in a radio communication system where small cells that use a second frequency are arranged within a macro cell that uses a first frequency.

(First Example)

Now, a communication control method according to a first example will be described with reference to FIGS. 7 and 8. In the communication control method according to the first example, a macro base station decides whether or not a user terminal can detect the discovery signal, based on the user terminal's capability information. When the macro base station decides that the user terminal can detect the discovery signal, the macro base station reports measurement gap pattern information, which represents the measurement gap pattern 2 (that is, an MGL that is the same as the DS transmission duration and an MGRP that is the same as the DS cycle), and DS configuration information, to the user terminal.

Figures 7A, 7B:
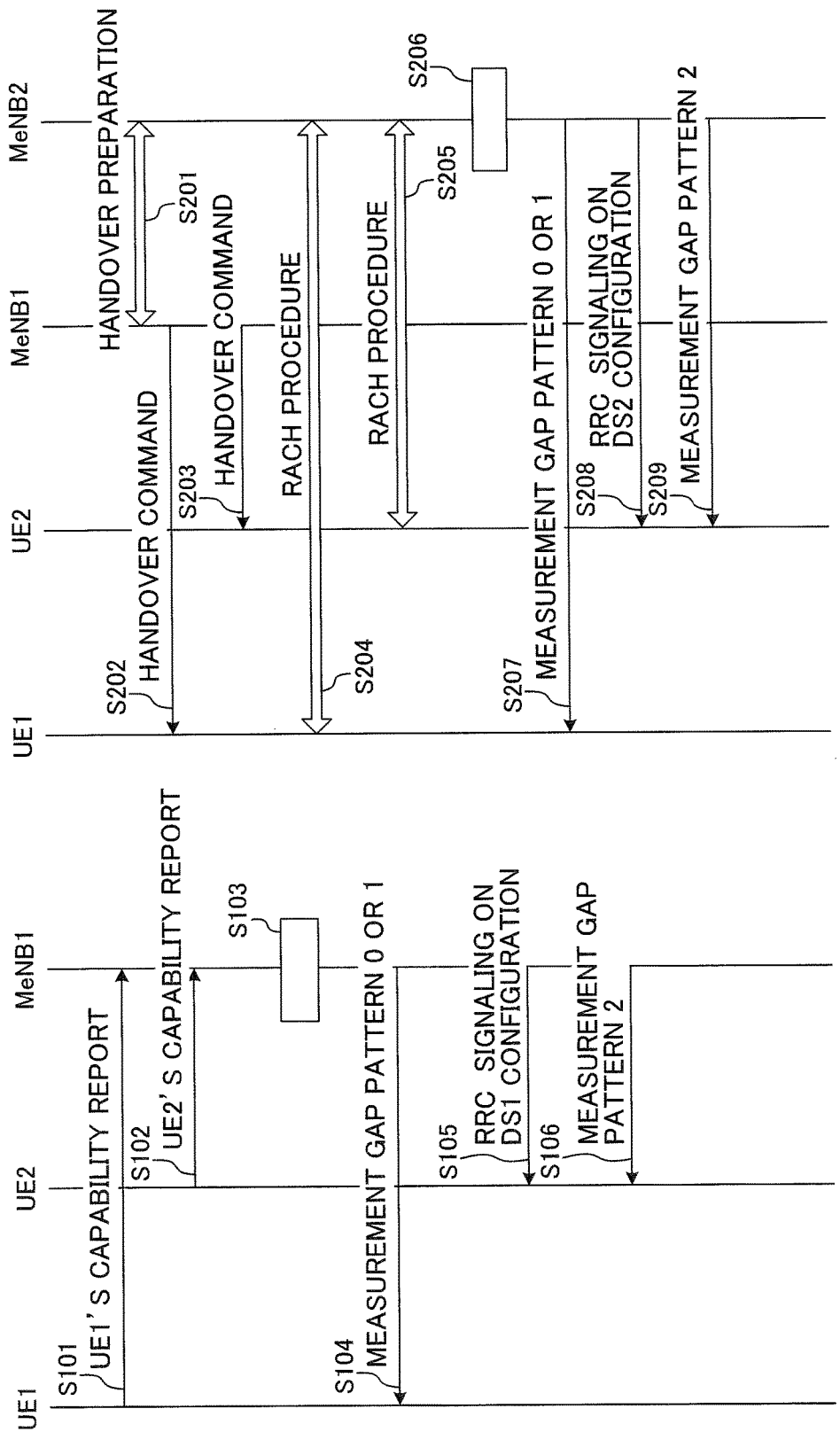
FIG. 7 provides diagram to explain a communication control method according to a first example of the present embodiment.
Figure 8:
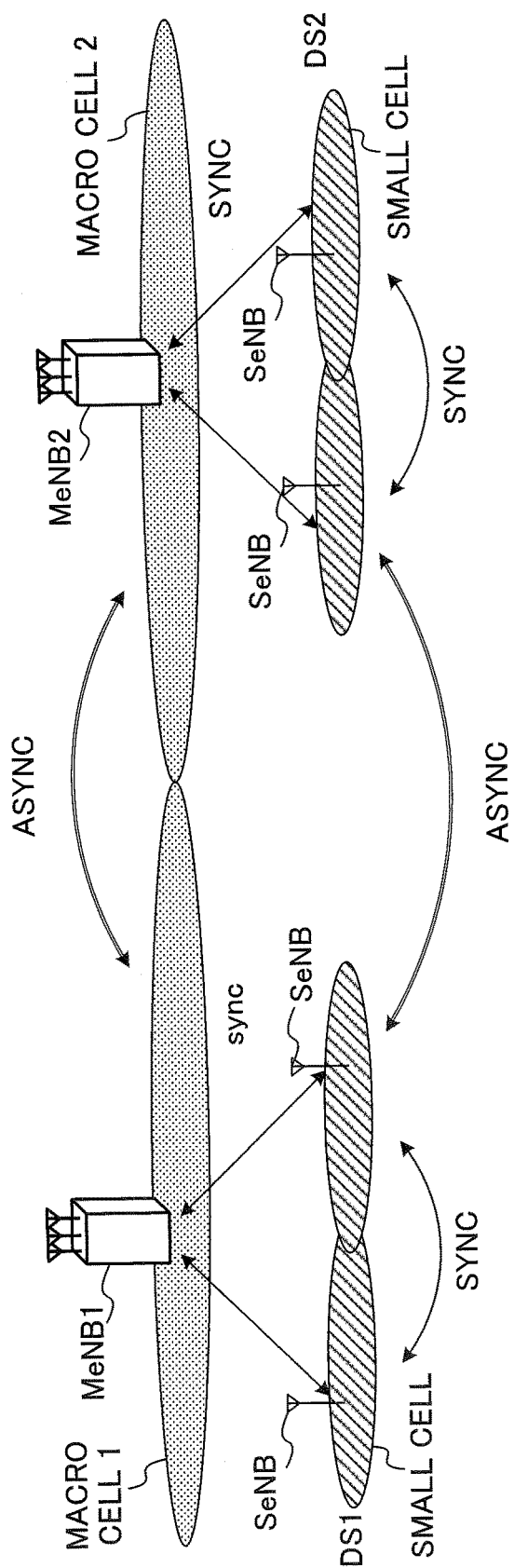
FIG. 8 is a diagram to explain handover according to the present embodiment.

FIG. 7 provides diagrams to explain the communication control method according to the first example. In FIG. 7A, the user terminals 1 and 2 are located within the macro cell 1. Also, in FIG. 7A, small cells are arranged within the macro cell 1 (see FIG. 8).

As shown in FIG. 7A, the user terminal 1 reports the capability information of the user terminal 1 (UE capability) to the macro base station 1 (step S101). Also, the user terminal 2 reports the capability information of the user terminal 2 to the macro base station 1 (step S102). Note that the capability information is reported by using, for example, higher layer signaling such as RRC signaling.

Based on the capability information reported from the user terminals 1 and 2, the macro base station 1 decides whether or not the user terminals 1 and 2 can detect the discovery signal (step S103). For example, the macro base station 1 may decide that the discovery signal can be detected if the user terminals support the LTE-A (Long Term Evolution-Advanced) release 12 scheme. Here, the macro base station 1 decides that the user terminal 2 can detect the discovery signal and that the user terminal 1 cannot detect the discovery signal.

The macro base station 1 transmits, to the user terminal 1 that cannot detect the discovery signal, measurement gap pattern information to represent a measurement gap pattern 0 (that is, MGL=6 ms and MGRP=40 ms) or a measurement gap 1 (that is, MGL=6 ms and MGRP=80 ms) (step S104). This measurement gap pattern information may be, for example, the gap pattern identifier (FIG. 6A) or may be the gap offset.

Meanwhile, the macro base station 1 transmits DS configuration information 1 to the user terminal 2 that can detect the discovery signal (step S105). The DS configuration information 1 includes at least one of the DS transmission duration, the DS cycle and the DS start offset in the small cells within the macro cell 1. The DS configuration information 1 is notified through higher layer signaling such as RRC signaling.

Also, the macro base station 1 reports, to the user terminal 2 that can detect the discovery signal, measurement gap pattern information to represent a measurement gap pattern 2 (that is, an MGL that is the same as the DS transmission duration and an MGRP that is the same as the DS cycle) (step S106). This measurement gap pattern information may be the gap pattern identifier (FIG. 6A), or may be a gap offset which can specify the measurement gap pattern 2.

As shown in FIG. 6B, the user terminal 2 configures measurement gaps in the MGL and MGRP represented by the measurement gap pattern information of step S106, using a gap offset that is the same as the DS start offset of step S105. By this means, the DS transmission durations and the measurement gaps match.

In the measurement gaps, the user terminal 2 switches the frequency F1 to the frequency F2, and measures the received quality (for example, the RSRP, the RSRQ, the SINR and so on) of the discovery signal transmitted using the frequency F2. The user terminal 2 reports the measurement result to the macro base station as a measurement report.

Next, another example of the communication control method according to the first example will be described with reference to FIGS. 7B and 8. Assume that, in FIG. 7B, the user terminal 1 performs the processes shown in steps S101 and S104 in FIG. 7A. Also, assume that the user terminal 2 performs the processes shown in steps S102, S105 and S106 in FIG. 7A.

Also, FIG. 7B assumes a case where the user terminals 1 and 2 make a handover from the macro base station 1 (macro cell 1) to the macro base station 2 (macro cell 2). Here, as shown in FIG. 8, the macro base station 1 (macro cell 1) and the macro base station 2 (macro cell 2) are asynchronous.

Consequently, the DS start offset, DS cycle and DS transmission duration in the small cells within in the macro cell 1 are different from the DS start offset, DS cycle and DS transmission duration in the small cells within the macro cell 2. Note that, since the small cells within the macro cell 1 are synchronized, the same DS start offset, DS cycle and DS transmission duration are used between these small cells. The same holds for the small cells within the macro cell 2.

As shown in FIG. 7B, between macro base stations 1 and 2, the preparation process for a handover (handover preparation) is made (step S201). When the preparation process is complete, the macro base station 1 transmits a command for a handover (handover command) to the macro base station 2 to the user terminal 1 (step S202). Likewise, the macro base station 1 transmits a command for a handover (handover command) to the macro base station 2 to the user terminal 2 (step S203).

In response to the handover command from the macro base station 1, the user terminal 1 performs the random access procedures (RACH procedures) with respect to the macro base station 2 (step S204). Similarly, in response to the handover command from the macro base station 1, the user terminal 2 carries out the random access procedures (RACH procedures) with respect to the macro base station 2 (step S205). In the random access procedures, the capability information of the user terminals 1 and 2 may be reported to the macro base station 2.

Based on the capability information of the user terminals 1 and 2, the macro base station 2 decides whether or not the user terminals 1 and 2 can detect the discovery signal (step S206). The macro base station 1 reports measurement gap pattern information to represent the measurement gap pattern 0 or 1, to the user terminal 1 that cannot detect the discovery signal (step S207).

Meanwhile, the macro base station 2 reports DS configuration information 2 to the user terminal 2 that can detect the discovery signal (step S208). The DS configuration information 2 includes at least one of the DS transmission duration, the DS cycle and the DS start offset in the small cells within the macro cell 2. The DS configuration information 2 may be notified through higher layer signaling such as RRC signaling.

Also, the macro base station 2 reports, to the user terminal 2 that can detect the discovery signal, measurement gap pattern information to represent the measurement gap pattern 2 (that is, an MGL that is the same as the DS transmission duration in the small cells serving under the macro cell 2 and an MGRP that is the same as the DS cycle) (step S209).

As shown in FIG. 6B, the user terminal 2 re-configures the measurement gaps in the MGL and MGRP represented by the measurement gap pattern information of step S209, using a gap offset that is the same as the DS start offset of step S208. By this means, the DS transmission durations and the measurement gaps match in time.

(Second Example)

A communication control method according to a second example will be described with reference to FIG. 9. With the communication control method according to the second example, a macro base station reports measurement gap pattern information to represent the measurement gap pattern 2, and DS configuration information, to a user terminal, regardless of whether or not the user terminal can detect the discovery signal.

A user terminal decides whether or not the user terminal can detect the discovery signal, and, based on the decision, configures measurement gaps in the MGL and MGRP represented by the above measurement gap pattern information, using a gap offset that is the same as the DS start offset. Now, differences from the communication control method according to the first example will be primarily described.

Figures 9A, 9B:
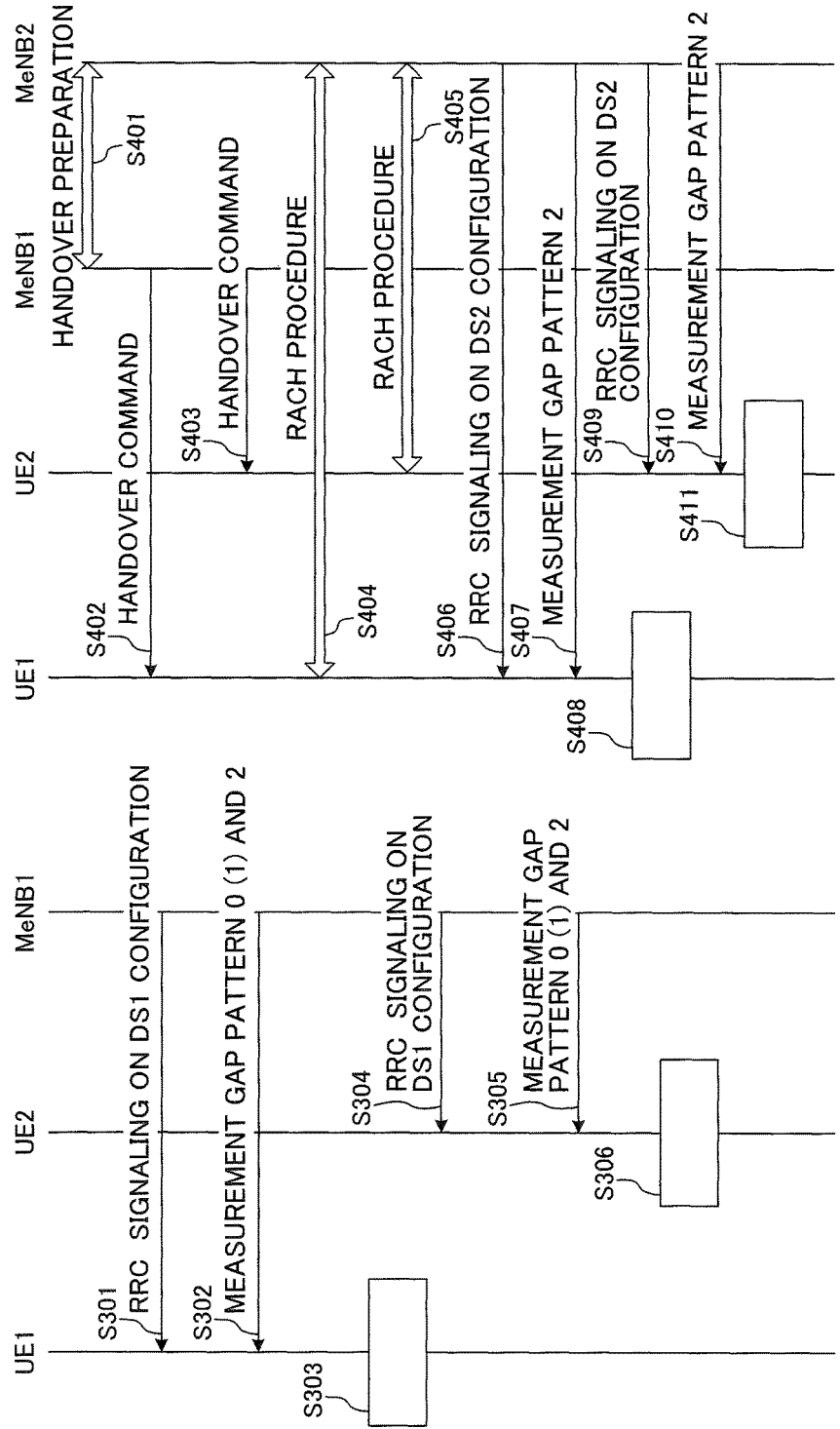
FIG. 9 provides diagrams to explain a communication control method according to a second example of the present embodiment.

FIG. 9 provides diagrams to explain the communication control method according to the second example. As shown in FIG. 9A, the macro base station 1 reports DS configuration information 1 to the user terminal 1 (step S301). The DS configuration information 1 has been described with respect to step 105 of FIG. 7A.

Also, the macro base station 1 reports measurement gap pattern information to represent the measurement gap pattern 2, in addition to the measurement gap pattern 0 or 1, to the user terminal 1 (step S302).

The user terminal 1 decides whether or not the discovery signal can be detected (step S303). Here, the user terminal 1 decides that the discovery signal cannot be detected, and therefore measurement gaps are configured in the measurement gap pattern 0 (that is, MGL=6 ms and MGRP=40 ms) or in the measurement gap pattern 1 (that is, MGL=6 ms and MGRP=80 ms).

Similarly, the macro base station 1 reports the DS configuration information 1 to the user terminal 2 (step S304). Also, the macro base station 1 reports measurement gap pattern information to represent the measurement gap pattern 2, in addition to the measurement gap pattern 0 or 1, to the user terminal 2 (step S305).

The user terminal 2 decides whether or not the discovery signal can be detected (step S306). Here, the user terminal 2 decides that the discovery signal cannot be detected, and therefore measurement gaps are configured in the measurement gap pattern 2 (that is, an MGL that is the same as the DS transmission duration and an MGRP that is the same as the DS cycle).

Next, another example of the communication control method according to the second example will be described with reference to FIG. 9B. Assume that, in FIG. 9B, the user terminal 1 performs the processes shown in steps S301 to S303 in FIG. 9A. Also, assume that the user terminal 2 performs the processes shown in steps S304 to S306 in FIG. 9A. Note that steps S401 to S405 of FIG. 9B are the same as steps S201 to S205 of FIG. 7B and therefore will not be described again.

As shown in FIG. 9B, the macro base station 2 reports the DS configuration information 2 in the small cells within the macro cell 2 to the user terminal 1 (step S406). The DS configuration information 2 has been described with respect to step S208 of FIG. 7B.

Also, macro base station 2 reports, to the user terminal 1, measurement gap pattern information to represent the measurement gap pattern 2 (that is, an MGL that is the same as the DS transmission duration in the small cells within the macro cell 2, and an MGRP that is the same as the DS cycle) (step S407). Note that, the MGLs and MGRPs of the measurement gap patterns 0 and 1 are the same between the macro cells 1 and 2, so that, in step S407, the measurement gap pattern information to represent the measurement gap patterns 0 and 1 needs not be notified.

The user terminal 1 decides whether or not the discovery signal can be detected (step S408). Here, the user terminal 1 decides that the discovery signal cannot be detected, and therefore measurement gaps are configured in the measurement gap pattern 0 (that is, MGL=6 ms and MGRP=40 ms) or in the measurement gap pattern 1 (that is, MGL=6 ms and MGRP=80 ms).

Similarly, the macro base station 2 reports the DS configuration information 2 to the user terminal 2 (step S409). Also, the macro base station 2 reports measurement gap pattern information to represent the measurement gap pattern 2 to the user terminal 2 (step S410).

The user terminal 2 decides whether or not the discovery signal can be detected (step S411). Here, the user terminal 2 decides that the discovery signal can be detected, and therefore measurement gaps to have an MGL that is the same as the DS transmission duration and an MGRP that is the same as the DS cycle are re-configured, using a gap offset that is the same as the DS start offset.

(Advantages)

With the above communication control methods according to the first and second examples, measurement gaps to have an MGL that is the same as the DS transmission duration and an MGRP that is the same as the DS cycle are configured using a start offset that is the same as the DS start offset, so that it is possible to make the DS transmission durations and the measurement gaps match in time. As a result of this, when the discovery signal is used as a small cell detection/measurement signal, user terminals can detect small cells more reliably, while preventing the increase of power consumption in the user terminals.

Advantages of the communication control methods according to the first and second examples will be described with reference to FIG. 10. FIG. 10A shows the active time of user terminals (that is, the total time of measurement gaps) in the measurement gap patterns 0 to 2 (see FIG. 6A).

As shown in FIG. 10A, the measurement gap pattern 2 can make the active time of user terminals short, compared to the measurement gap patterns 0 and 1. Consequently, the measurement gap pattern 2 can reduce the power consumption in user terminals, compared to the measurement gap patterns 0 and 1.

FIG. 10B shows the ratio of discovery signal detection in the measurement gap patterns 0 to 2 (FIG. 6B). As shown in FIG. 10B, the DS transmission durations and the measurement gaps match in time in the measurement gap pattern 2, so that the discovery signal detection ratio is nearly 100%.

Meanwhile, in FIG. 10B, the DS transmission durations and the measurement gaps in the measurement gap patterns 0 and 1 may not always overlap, so that the ratio of discovery signal detection decreases. In this way, in the measurement gap pattern 2, the discovery signal can be detected reliably, compared to the measurement gap patterns 0 and 1.

(Structure of Radio Communication System)

Now, a radio communication system according to the present embodiment will be described below in detail. In this radio communication system, the above-described communication control methods of the first and second examples are employed.

Figure 11:
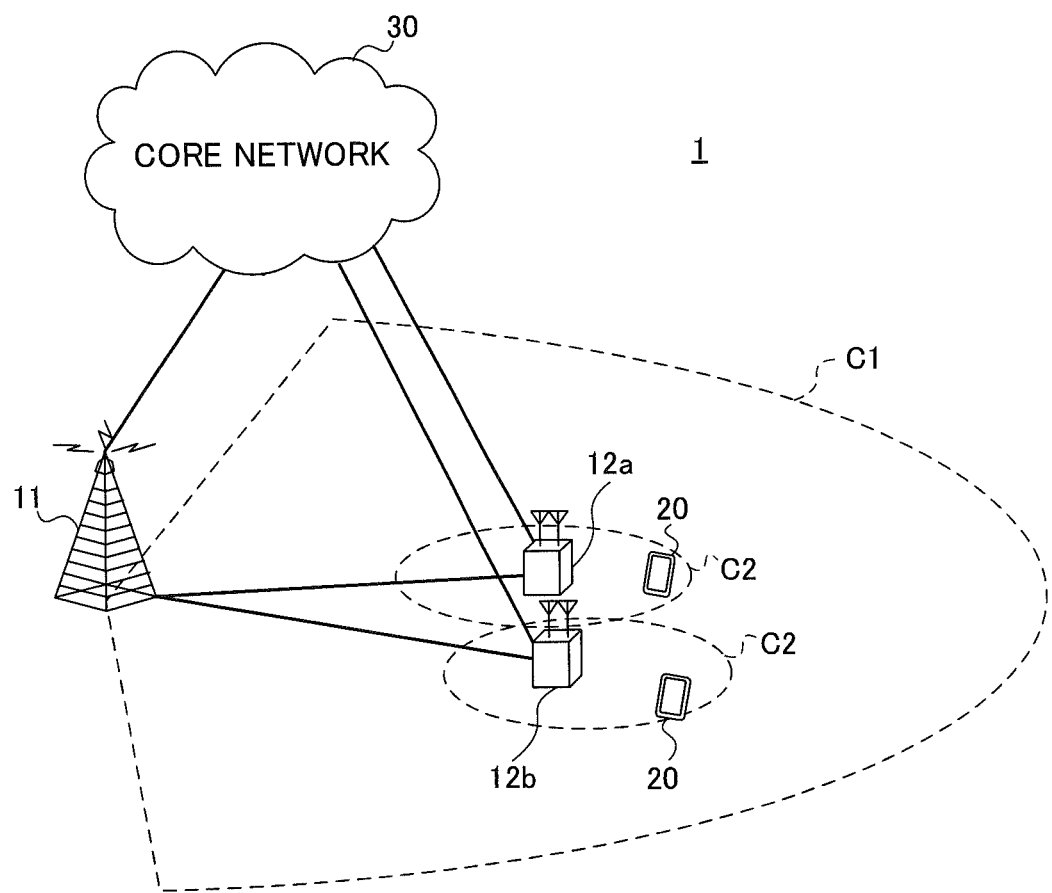
FIG. 11 is a schematic diagram to show an example of a radio communication system according to the present embodiment.

FIG. 11 is a diagram to show a schematic structure of the radio communication system according to the present embodiment. As shown in FIG. 11, the radio communication system 1 has a macro base station 11 that forms a macro cell C1, and small base stations 12a and 12b that form small cells C2 that are placed within the macro cell C1 and that are narrower than the macro cell C1. Also, in the macro cell C1 and in each small cell C2, user terminals 20 are placed. Note that the numbers of macro cells C1 (macro base stations 11), small cells C2 (small base stations 12) and user terminals 20 are not limited to those shown in FIG. 11.

Also, in the macro cell C1 and in each small cell C2, user terminals 20 are placed. The user terminals 20 are configured to be able to perform radio communication with the macro base station 11 and/or the small base stations 12.

Between the user terminals 20 and the macro base station 11, communication is carried out using a frequency F1 (carrier) of a relatively low frequency band (for example, 2 GHz). On the other hand, between the user terminals 20 and the small base stations 12, a frequency (carrier) of a relatively high frequency band (for example, 3.5 GHz) is used. Note that the frequency bands to use in the macro base station 11 and the small base stations 12 are by no means limited to these.

Also, the macro base station 11 and each small base station 12 may be connected via a channel of relatively low speed such as the X2 interface (non-ideal backhaul), may be connected via a channel of relatively high speed (low delay) such as optical fiber (ideal backhaul), or may be connected via radio. Also, the small base stations 12 may be connected via a channel of relatively low speed such as the X2 interface (non-ideal backhaul), may be connected via a channel of relatively high speed such as optical fiber (ideal backhaul), or may be connected via radio.

The macro base station 11 and the small base stations 12 are each connected with a core network 30. In the core network 30, core network devices such as an MME (Mobility Management Entity), an S-GW (Serving-GateWay), a P-GW (Packet-GateWay) and so on are provided.

Also, the macro base station 11 is a radio base station having a relatively wide coverage, and may be referred to as an "eNodeB," a "macro base station," an "aggregation node," a "transmission point," a "transmitting/receiving point" and so on. The small base stations 12 are radio base stations that have local coverages, and may be referred to as "small base stations," "pico base stations," "femto base stations," "HeNBs (Home eNodeBs)," "RRHs (Remote Radio Heads)," "micro base stations," "transmission points," "transmitting/receiving points" and so on.

Also, if no distinction is made between the macro base station 11 and the small base stations 12, these will be collectively referred to as the "radio base station 10." The user terminals 20 are terminals to support various communication schemes such as LTE, LTE-A and so on, and may include both mobile communication terminals and fixed communication terminals.

Also, in the radio communication system 1, a physical downlink shared channel (PDSCH: Physical Downlink Shared Channel), which is used by each user terminal 20 on a shared basis, physical downlink control channels (PDCCH (Physical Downlink Control Channel), EPDCCH (Enhanced Physical Downlink Control Channel), a physical broadcast channel (PBCH) and so on are used as downlink physical channels. User data and higher layer control information are transmitted by the PDSCH. Downlink control information (DCI) is transmitted by the PDCCH and the EPDCCH.

Also, in the radio communication system 1, a physical uplink shared channel (PUSCH: Physical Uplink Shared Channel), which is used by each user terminal 20 on a shared basis, a physical uplink control channel (PUCCH: Physical Uplink Control Channel) and so on are used as uplink physical channels. User data and higher layer control information are transmitted by the PUSCH. Also, downlink radio quality information (CQI: Channel Quality Indicator), delivery acknowledgment information (ACKs/NACKs) and so on are transmitted by the PUCCH.

Figure 12:
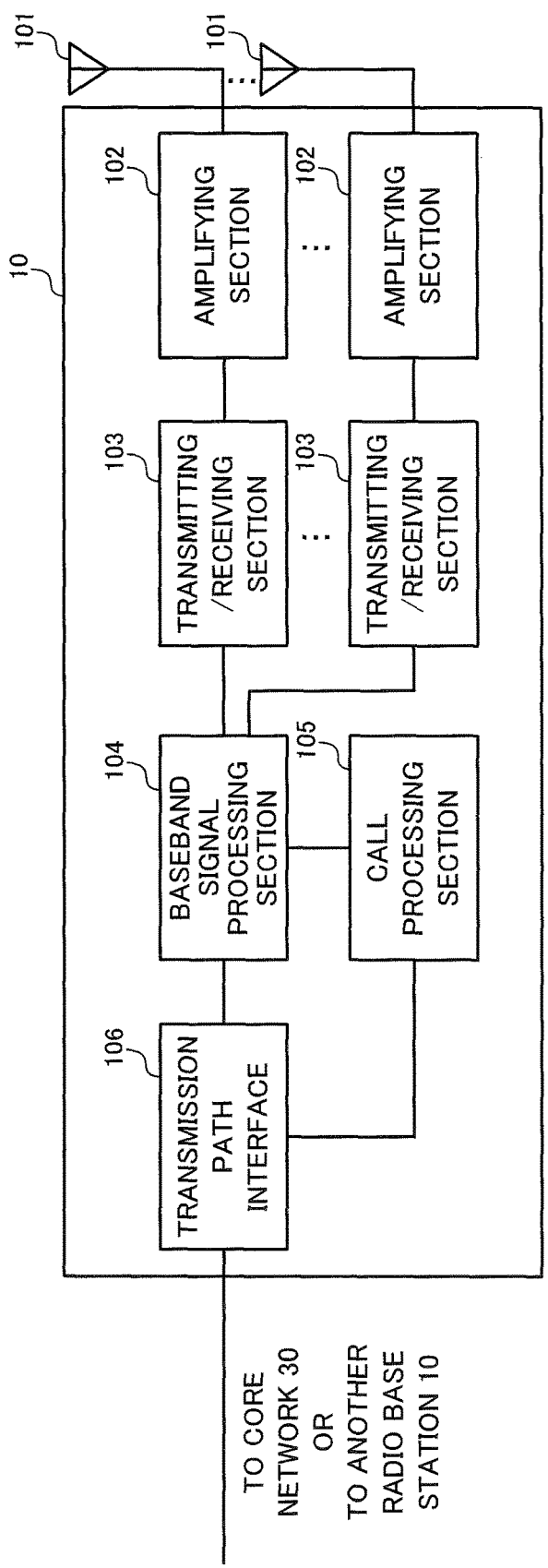
FIG. 12 is a diagram to show an overall structure of a radio base station 10 according to the present embodiment.

Now, the structures of a radio base station 10 (which may be either a macro base station 11 or a small base station 12) and a user terminal 20 will be described with reference to FIGS. 12 and 13. FIG. 12 is a diagram to show an overall structure of the radio base station 10.

As shown in FIG. 12, the radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to the user terminal 20 on the downlink is input from the S-GW provided in the core network 30, into the baseband signal processing section 104, via the transmission path interface 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is transferred to each transmitting/receiving section 103. Furthermore, downlink control signals (including reference signals, synchronization signals, broadcast signal, etc.) are also subjected to transmission processes such as channel coding and an inverse fast Fourier transform, and are transferred to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

Note that each transmitting/receiving section 103 in a small base station 12 may transmit the detection/measurement signal (for example, the discovery signals and so on) to use in small cell detection and/or measurements. Also, each transmitting/receiving section 103 in a macro base station 11 may transmit higher layer control information (for example, the above-described DS configuration information, measurement gap pattern information and so on). In this way, each transmitting/receiving section 103 constitutes the transmission section of the present invention.

On the other hand, as for uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is transferred to the core network 30 via the transmission path interface 106. The call processing section 105 performs call processing such as setting up and releasing communication channels, manages the state of the radio base station 10 and manages the radio resources.

Figure 13:
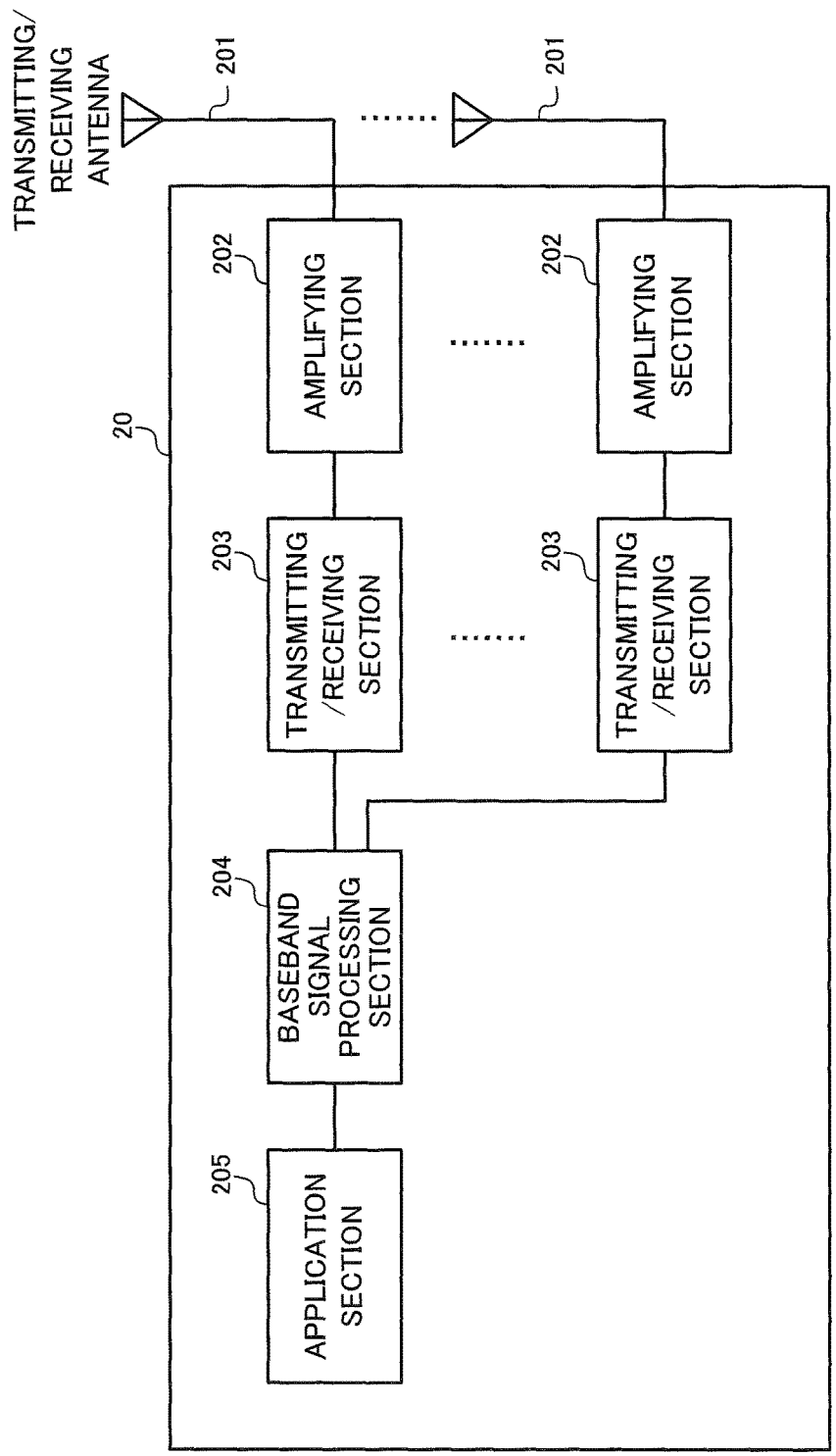
FIG. 13 is a diagram to show an overall structure of a user terminal according to the present embodiment.

FIG. 13 is a diagram to show an overall structure of a user terminal 20 according to the present embodiment. The user terminal 20 has a plurality of transmitting/receiving antennas 201 for MIMO transmission, amplifying sections 202, transmitting/receiving sections 203, a baseband signal processing section 204 and an application section 205. Note that the user terminal 20 switches between frequencies F1 and F2 for reception, by means of one receiving circuit (RF circuit).

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, an FFT process, error correction decoding, a retransmission control receiving process and so on are performed. The user data that is included in the downlink signals is transferred to the application section 205. The application section 205 performs processes related to higher layers above the physical layer and the MAC layer. The broadcast information in the downlink data is also transferred to the application section 205.

Note that the transmitting/receiving sections 203 may receive the detection/measurement signals (for example, the discovery signals and so on) from the small base stations 12. Also, the transmitting/receiving sections 203 may receive higher layer control information (for example, the above-described DS configuration information, measurement gap pattern information and so on) from the macro base station 11. In this way, the transmitting/receiving sections 203 constitute the receiving section of the present invention.

Meanwhile, uplink user data is input from the application section 205 into the baseband signal processing section 204. The baseband signal processing section 204 performs a retransmission control (H-ARQ (Hybrid ARQ)) transmission process, channel coding, pre-coding, a DFT process, an IFFT process and so on, and transfers the result to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 14:
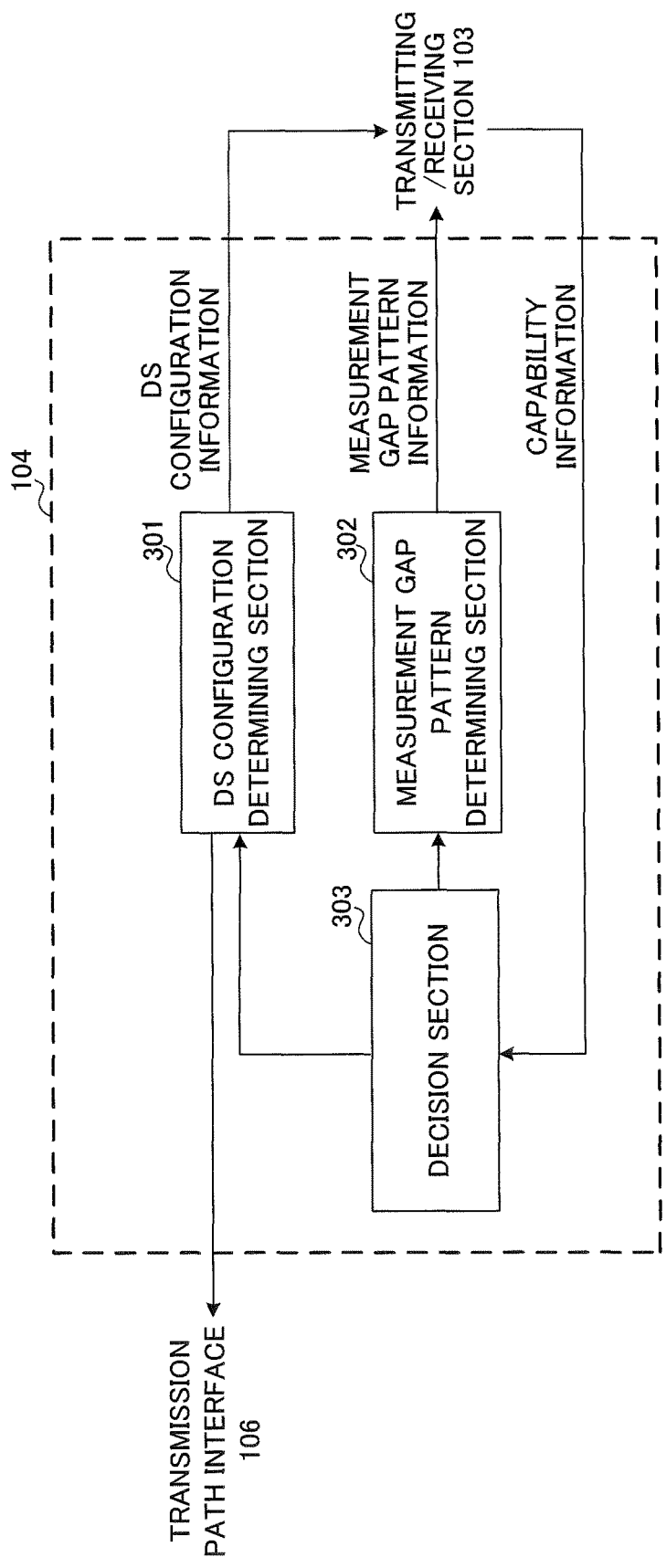
FIG. 14 is a diagram to show a functional structure of a macro base station according to the present embodiment.
Figure 15:
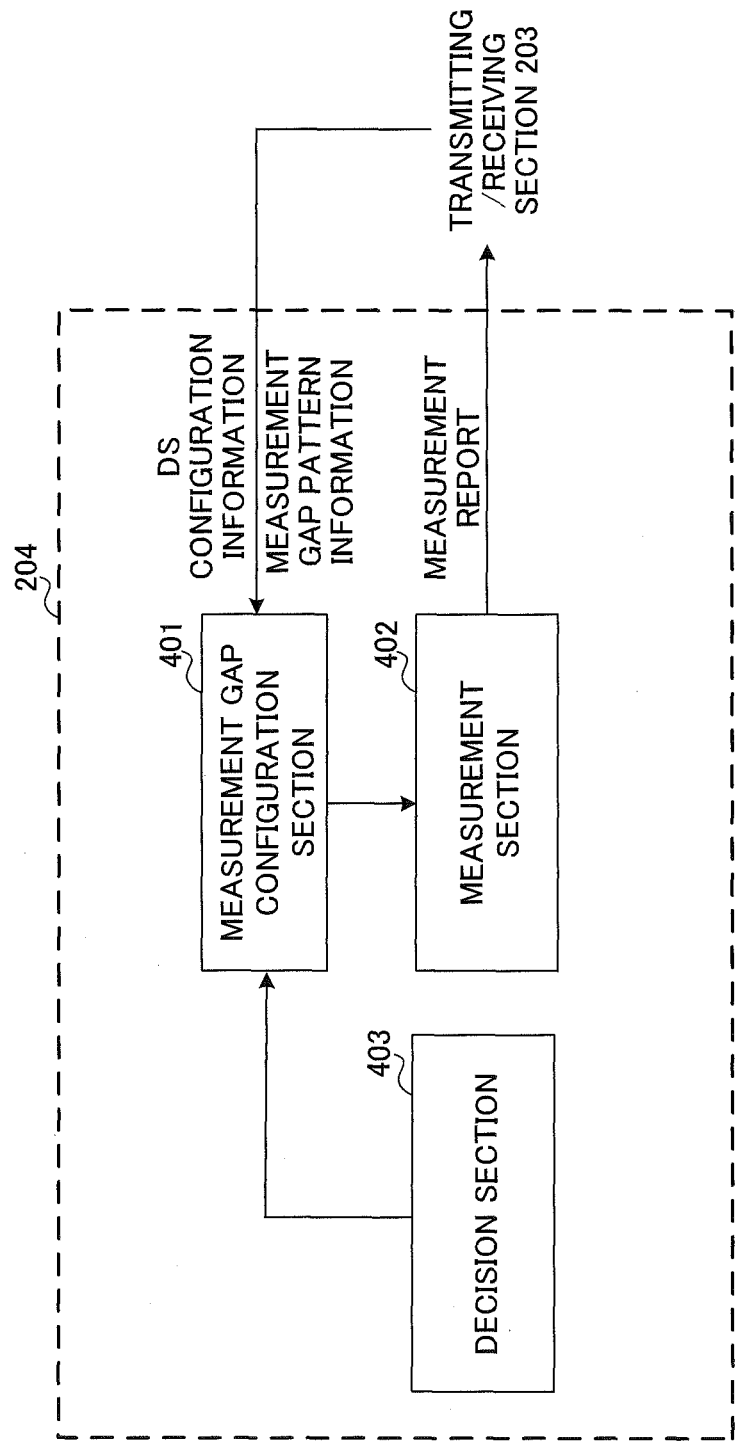
FIG. 15 is a diagram to show a functional structure of a user terminal according to the present embodiment.

Next, the functional structures of the macro base station 11 and the user terminal 20 will be described in detail with reference to FIG. 14 and FIG. 15. The functional structure of the macro base station 11 shown in FIG. 14 is primarily formed with the baseband signal processing section 104. Also, the functional structure of the user terminal 20 shown in FIG. 15 is primarily formed with the baseband signal processing section 204.

FIG. 14 is a diagram to show a functional structure of a macro base station 11 according to the present embodiment. As shown in FIG. 14, the macro base station 11 has a DS configuration determining section 301, a measurement gap pattern determining section 302 and a decision section 303. Note that, in the communication control method according to the second example, the decision section 303 may be omitted. The determining section of the present invention is formed with the DS configuration determining section 301 and the measurement gap pattern determining section 302.

The DS configuration determining section 301 determines the discovery signal (DS) configuration. To be more specific, the DS configuration determining section 301 determines at least one of the DS cycle, DS transmission duration and DS start offset. As noted earlier, the DS cycle is the transmission cycle of the discovery signal, the DS transmission duration is the transmission duration (the length of transmission time) of the discovery signal, and the DS start offset is the start offset from the top of a radio frame to the beginning of a DS transmission duration.

The DS configuration determining section 301 outputs DS configuration information, which includes at least one of the DS cycle, DS transmission duration and DS start offset that is determined, to the transmitting/receiving sections 103. The DS configuration information is notified to the user terminal 20 through higher layer signaling such as RRC signaling. Also, the DS configuration information may be notified to the small base stations 12 serving under the macro base station 11 via the transmission path interface 106.

The measurement gap pattern determining section 302 determines the measurement gap pattern, which are defined with the MGL and the MGRP, with reference to a table (FIG. 6A) that is stored in a storage section (not shown). As noted earlier, the MGL is the measurement gap time length, and the MGRP is the measurement gap repetition period.

Also, the measurement gap pattern determining section 302 outputs measurement gap pattern information, which represents the determined measurement gap pattern, to the transmitting/receiving sections 103. As noted earlier, the measurement gap pattern information may be the gap pattern identifier, as shown in FIG. 6A. Also, the measurement gap pattern information is notified to the user terminal through higher layer signaling such as RRC signaling, through broadcast information, and so on.

Also, when the decision section 303 (described later) decides that the user terminal 20 can detect the discovery signal, the measurement gap pattern determining section 302 may select the measurement gap pattern 2 (that is, an MGL that is the same as the DS transmission duration and an MGRP that is the same as the DS cycle).

The decision section 303 determines whether or not the user terminal 20 can detect the discovery signal based on the capability information of the user terminal 20. As described earlier, the decision section 303 may decide that the user terminal 20 can detect the discovery signal when the LTE-A scheme is used.

FIG. 16 is a diagram to show a functional structure of a user terminal 20 according to the present embodiment. As shown in FIG. 15, the user terminal 20 has a measurement gap configuration section 401, a measurement section 402 and a decision section 403. Note that, in the communication control method according to the first example, the decision section 403 may be omitted. The configuration section of the present invention is formed with the measurement gap configuration section 401.

The measurement gap configuration section 401 configures (re-configures) measurement gaps with the MGL and MGRP represented by the measurement gap pattern information, by using a gap offset. These measurement gap pattern information and gap offset are received in the transmitting/receiving sections 203 from the macro base station 11 and input in the measurement gap configuration section 401.

When measurement gap pattern information to represent the measurement gap pattern 2 (that is, an MGL that is the same as the DS transmission duration and an MGRP that is the same as the DS cycle) is input from the transmitting/receiving sections 203, the measurement gap configuration section 401 may configure measurement gaps in an MGL that is the same as the DS transmission duration and an MGRP that is the same as the DS cycle, using a start offset that is the same as the DS start offset.

Also, when the decision section 403 (described later) decides that the user terminal 20 can detect the discovery signal, the measurement gap configuration section 401 may configure measurement gaps in an MGL that is the same as the DS transmission duration and an MGRP that is the same as the DS cycle, using a start offset that is the same as the DS start offset. DS configuration information to include this DS start offset is received in the transmitting/receiving sections 203 from the macro base station 11, and input in the measurement gap configuration section 401.

Also, the measurement gap configuration section 401 may re-configure the measurement gaps when the user terminal 20 makes a handover to another macro cell C1. To be more specific, the measurement gap configuration section 401 may re-configure measurement gaps having an MGL that is the same as the DS transmission duration and an MGRP that is the same as the DS cycle, using a start offset that is the same as the DS start offset.

The measurement section 402 detects small cells C2 by carrying out inter-frequency measurements in the measurement gaps configured by the measurement gap configuration section 401. To be more specific, in the measurement gaps, the measurement section 402 switches the frequency F1 to the frequency F2, and measures the received quality of the discovery signals transmitted from the small base stations 11. As noted earlier, the received quality includes the RSRP, RSRQ, SINR, SNR and so on.

Also, the measurement section 402 outputs the measurement result to the transmitting/receiving sections 203 as a measurement report. This measurement report is reported to the macro base station 11 through, for example, higher layer signaling such as RRC signaling.

The decision section 403 decides whether or not the user terminal 20 can detect the discovery signal based on the capability information of the user terminal 20. As noted earlier, the decision section 403 may decide that the user terminal 20 can detect the discovery signal when the LTE-A scheme is used.

With the radio communication system 1 according to the present embodiment, measurement gaps are configured with tan MGL that is the same as the DS transmission duration and an MGRP that is the same as the DS cycle, using a start offset that is the same as the DS start offset, so that it is possible to make the DS transmission durations and the measurement gaps match in time. As a result of this, when the discovery signal is used as a small cell detection/measurement signal, user terminals can detect small cells more reliably, while preventing the increase of power consumption in user terminals.

Note that, although, in the radio communication system 1, the measurement gap pattern information and DS configuration information are notified from the macro base station 11 to the user terminal 20, these pieces of information may be notified from any device as long as the device is a device on the network side (for example, the small base stations 12 and so on.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2013-160728, filed on Aug. 1, 2013, including the specification, drawings and abstract, is incorporated herein by reference in its entirety.

The invention claimed is:

1. A user terminal for use in a radio communication system where a small cell to use a second frequency is placed within a macro cell to use a first frequency, the user terminal comprising:
 a receiving section that receives, from a macro base station forming the macro cell, measurement gap pattern information to represent a repetition period that is the same as a transmission cycle of a detection/measurement signal in the small cell and a length of time that is the same as a transmission duration of the detection/measurement signal, and a start offset of the transmission duration; and
 a configuration section that configures a measurement gap of the repetition period and the length of time, by using a measurement gap offset that is the same as the start offset of the transmission duration.

2. The user terminal according to claim 1, further comprising a transmission section that transmits capability information of the user terminal to the macro base station,
 wherein, when the macro base station decides that the user terminal can detect the detection/measurement signal, based on the capability information, the receiving section receives the measurement gap pattern information and the start offset of the transmission duration from the macro base station.

3. The user terminal according to claim 2, wherein, when the user terminal makes a handover from the macro base station to another macro base station, the receiving section receives the measurement gap pattern information and the start offset of the transmission duration from the other macro base station, and the configuration section re-configures the measurement gap by using the measurement gap offset that is the same as the start offset of the transmission duration.

4. The user terminal according to claim 2, further comprising a measurement section that measures received quality of the detection/measurement signal that is transmitted in the second frequency, in the measurement gap.

5. The user terminal according to claim 2, wherein the measurement gap pattern information and the start offset of the transmission duration are notified from the macro base station by using higher layer signaling.

6. The user terminal according to claim 1, further comprising a decision section that decides whether or not the user terminal can detect the detection/measurement signal,
 wherein, when the decision section decides that the user terminal can detect the detection/measurement signal, the configuration section configures the measurement gap by using the measurement gap offset that is the same as the start offset of the transmission duration.

7. The user terminal according to claim 6, wherein, when the user terminal makes a handover from the macro base station to another macro base station, the receiving section receives the measurement gap pattern information and the start offset of the transmission duration from the other macro base station, and the configuration section re-configures the measurement gap by using the measurement gap offset that is the same as the start offset of the transmission duration.

8. The user terminal according to claim 6, further comprising a measurement section that measures received quality of the detection/measurement signal that is transmitted in the second frequency, in the measurement gap.

9. The user terminal according to claim 6, wherein the measurement gap pattern information and the start offset of the transmission duration are notified from the macro base station by using higher layer signaling.

10. The user terminal according to claim 1, wherein, when the user terminal makes a handover from the macro base station to another macro base station, the receiving section receives the measurement gap pattern information and the start offset of the transmission duration from the other macro base station, and the configuration section re-configures the measurement gap by using the measurement gap offset that is the same as the start offset of the transmission duration.

11. The user terminal according to claim 1, further comprising a measurement section that measures received quality of the detection/measurement signal that is transmitted in the second frequency, in the measurement gap.

12. The user terminal according to claim 1, wherein the measurement gap pattern information and the start offset of the transmission duration are notified from the macro base station by using higher layer signaling.

13. A macro radio base station that forms a macro cell in a radio communication system where a small cell to use a second frequency is placed within the macro cell to use a first frequency, the macro radio base station comprising:
 a determining section that determines a transmission cycle of a detection/measurement signal in the small cell, a transmission duration of the detection/measurement signal, and a start offset of the transmission duration; and
 a transmission section that transmits, to a user terminal, measurement gap pattern information to represent a repetition period that is the same as the transmission cycle and a length of time that is the same as the transmission duration, and the start offset of the transmission duration, wherein the user terminal configures a measurement gap of the repetition period and the length of time, by using a measurement gap offset that is the same as the start offset of the transmission duration.

14. The macro radio base station according to claim 13, further comprising:
a receiving section that receives capability information of the user terminal from the user terminal; and
a decision section that decides whether or not the user terminal can detect the detection/measurement signal,
wherein, when the decision section decides that the user terminal can detect the detection/measurement signal, the transmission section transmits the measurement gap pattern information and the start offset of the transmission duration to the user terminal.

15. A communication control method in a radio communication system where a small cell to use a second frequency is placed within a macro cell to use a first frequency, the communication control method comprising the steps of:
in a macro base station to form the macro cell notifying a user terminal of measurement gap pattern information to represent a repetition period that is the same as a transmission cycle of a detection/measurement signal in the small cell and a length of time that is the same as a transmission duration of the detection/measurement signal, and a start offset of the transmission duration; and
in the user terminal, configuring a measurement gap of the repetition period and the length of time, by using a measurement gap offset that is the same as the start offset of the transmission duration.

* * * * *